United States Patent
Huang

(10) Patent No.: US 6,871,383 B2
(45) Date of Patent: Mar. 29, 2005

(54) HINGE DEVICE

(75) Inventor: Chin-Fa Huang, Tu-chen (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 10/406,051

(22) Filed: Apr. 2, 2003

(65) Prior Publication Data

US 2004/0049883 A1 Mar. 18, 2004

(30) Foreign Application Priority Data

Sep. 17, 2002 (TW) .................................. 91214617 U

(51) Int. Cl.[7] .............................. E05F 1/08; E05D 11/08
(52) U.S. Cl. .............................. 16/295; 16/342; 16/337
(58) Field of Search .......................... 16/342, 337, 331, 16/338, 295; 361/681–683; 248/920, 922, 291.1

(56) References Cited

U.S. PATENT DOCUMENTS

| | | | | |
|---|---|---|---|---|
| 4,528,718 A | * | 7/1985 | Brockhaus | 16/266 |
| 5,197,704 A | * | 3/1993 | Kitamura | 248/292.11 |
| 5,354,028 A | * | 10/1994 | Kitamura | 248/292.11 |
| 5,503,491 A | | 4/1996 | Lu | |
| 5,566,048 A | * | 10/1996 | Esterberg et al. | 361/681 |
| 5,749,124 A | * | 5/1998 | Lu | 16/307 |
| 5,771,539 A | * | 6/1998 | Wahlstedt et al. | 16/285 |
| 5,896,622 A | * | 4/1999 | Lu | 16/342 |
| 6,145,797 A | * | 11/2000 | Uehara | 248/291.1 |
| 6,230,365 B1 | * | 5/2001 | Lu | 16/342 |
| 6,301,748 B1 | * | 10/2001 | Su-Man | 16/342 |

FOREIGN PATENT DOCUMENTS

| | | | | |
|---|---|---|---|---|
| JP | 1047337 A | * | 2/1998 | |
| JP | 11247837 A | * | 9/1998 | |
| JP | 11247840 A | * | 9/1999 | |
| WO | WO 95/16094 | * | 6/1995 | |

* cited by examiner

*Primary Examiner*—Chuck Y. Mah
(74) *Attorney, Agent, or Firm*—Wei Te Chung

(57) ABSTRACT

A hinge device includes a housing (10), a shaft (20), and a pair of springs (30) coiled in opposite directions from each other. The housing defines a through hole (11) and a slot (14) therein. The through hole includes a large hole (13) and a small hole (12), the large hole communicating with the slot. The shaft includes a first portion (22). Each spring has a free end (34), and forms a plurality of protrusions (32) on an inner surface thereof. The shaft is rotatably received in the through hole of the housing. The springs are frictionally positioned around the first portion of the shaft, the free ends of the springs being retained in the slot of the housing.

18 Claims, 4 Drawing Sheets

HINGE DEVICE

BACKGROUND OF THE INVENTION

1. Field of the Invention

The present invention relates to hinge devices, and more particularly to a spring hinge device which is provides balanced friction torque resistance when the hinge device is rotated in either of two opposite directions.

2. Related Art

A conventional hinge device for electronic equipment such as notebook computer comprises a helical spring fictionally wrapped around a shaft. The hinge device utilizes friction torque to enable smooth operation thereof. In a relaxed state, the spring has an inner diameter slightly less than the outer diameter of the shaft. The spring is thus frictionally engaged with the shaft so that the spring and shaft tend to rotate together. In use, the shaft in connected to a rotatable body of the notebook computer, such as a display thereof. When the rotatable body and the shaft are rotated, the spring being frictionally engaged to the shaft, tends to rotate accordingly. However, an end (or "toe") of the spring is engaged in a stationary support. The engagement of the toe in the stationary support causes the spring to slip relative to the shaft rather than rotate with the shaft, and this generates resistance to rotation known as friction torque.

This kind of hinge device is disclosed in U.S. Pat. No. 5,503,491, which is incorporated herein by reference. In U.S. Pat. No. 5,503,491, a friction results from a unitary spring urging against the inner periphery of a tapering rod portion of a first shaft and the periphery of a rod portion of a second shaft. When the shaft rotates in a first direction (e.g. clockwise), the unitary spring winds in a right hand direction and tightens. While the shaft rotates in an opposite second direction (e.g. anti-clock-wise), the unitary spring winds in a left hand direction and loosens. Thus the hinge device provides different torque resistances in different directions of rotation. This results in the unitary spring applying an uneven force on the shaft, whereby the hinge device does not operate smoothly.

A hinge device which solves the above-mentioned problems is desired.

SUMMARY OF THE INVENTION

Accordingly, a main object of the present invention is to provide a hinge device which provides balanced friction torque resistance when the hinge is rotated in either of two opposite directions.

Another object of the present invention is to provide a hinge device for conveniently pivotably joining a first article to a second article.

To achieve the above objects, a hinge device in accordance with the present invention comprises a housing, a shaft, and a pair of springs coiled in opposite directions from each other. The housing defines a through hole and a slot therein. The through hole comprises a large hole and a small hole, the large hole communicating with the slot. The shaft comprises a first portion. Each spring has a free end and forms a plurality of protrusions on an inner surface thereof. The springs are frictionally positioned around the first portion of the shaft. The shaft is rotatably received in the through hole of the housing, with the free ends of the springs being retained in the slot of the housing. The housing is coupled to a first article. The shaft is coupled to a second article. The hinge device thus pivotably joins the first article to the second article.

Other objects, advantages and novel features of the present invention will be drawn from the following detailed description of a preferred embodiment of the present invention with the attached drawings, in which:

DESCRIPTION OF THE PREFERRED EMBODIMENTS

Figure 1:
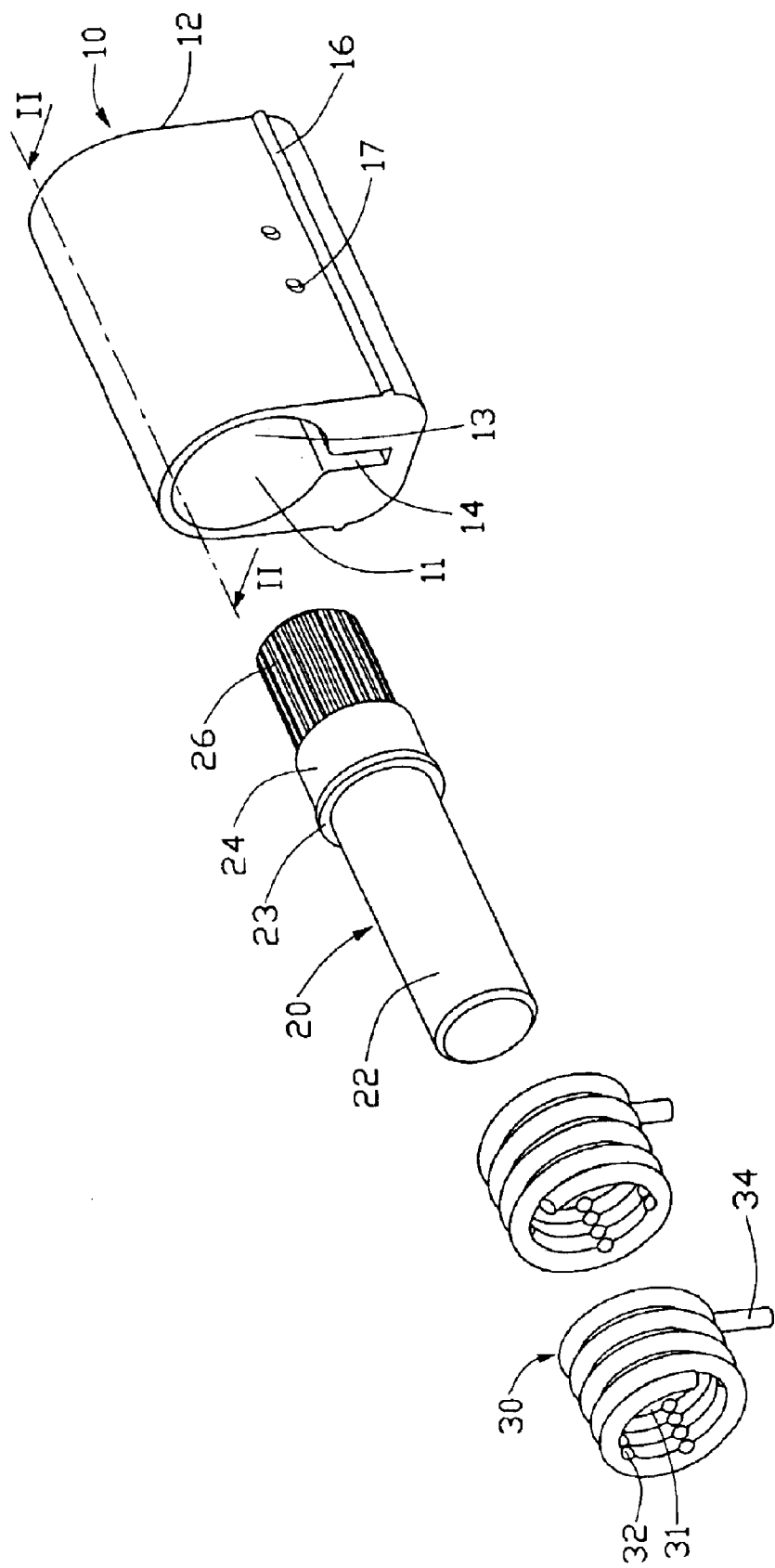
FIG. 1 is an exploded view of a hinge device of present invention, the hinge device comprising a housing, a shaft and a pair of helical springs.
Figure 4:
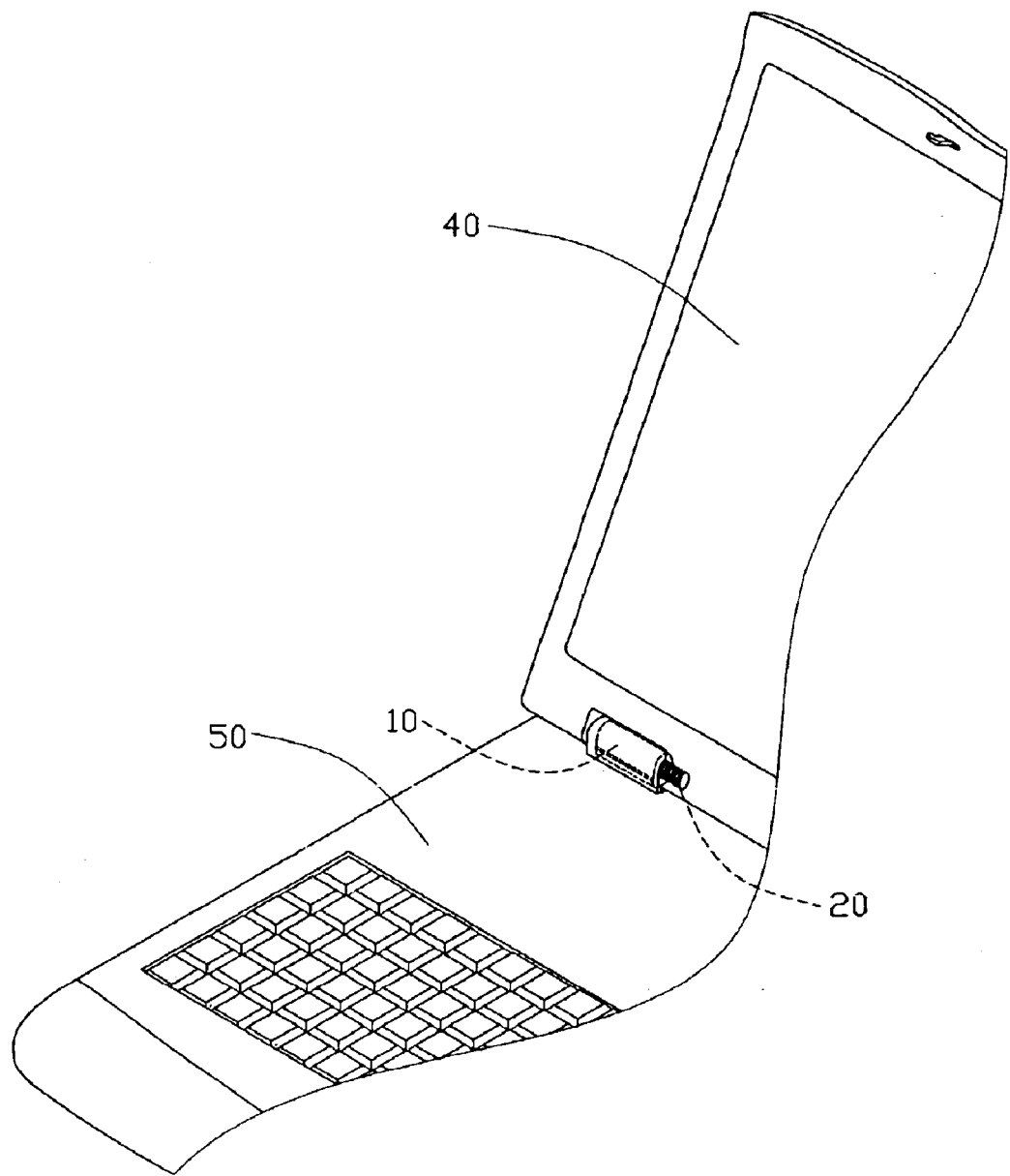
FIG. 4 is an isometric view of the hinge device of in a notebook computer.

Referring to FIGS. 1 and 4, a hinge device according to the present invention comprises a housing 10, a shaft 20 and a pair of helical springs 30. The housing 10 is coupled to a first article, such as a mainframe 50 of a notebook computer. The shaft 20 is coupled to a second article, such as a display 40 of the notebook computer.

The housing 10 defines a through hole 11 therein. The through hole 11 comprises a large hole 13 having a large diameter, and an adjacent small hole 12 having a small diameter. A shoulder 15 is formed at a junction of the small hole 12 and the large hole 13. The housing 10 further defines a slot 14 having an axis parallel to an axis of the through hole 11. The slot 14 is located below and is in communicated with the large hole 13. A pair of horizontal bars 16 protrudes from a bottom portion of each of opposite outer sides of the housing 10. A pair of apertures 17 is defined in said each of opposite sides of the housing 10 above the bars 16. The bars 16 and the apertures 17 are configured to couple the housing 10 to the mainframe 50.

The shaft 20 is rotatably received in the through hole 11 of the housing 10. The shaft 20 sequentially comprises a first portion 22, a locating portion 23, an intermediate portion 24, and a connecting portion 26. In the preferred embodiment of the present invention, the locating portion 23 is integrally formed with the shaft 20. Alternatively, the locating portion 23 can be a separate component attached to the shaft 20. An outer diameter of the locating portion 23 is larger than a diameter of the small hole 12 of the housing 10, and is smaller than a diameter of the large hole 11 of the housing 10. The connecting portion 26 defines a plurality of parallel grooves on an outer surface thereof, the grooves being parallel to an axis of the shaft 20.

The springs 30 are coiled in opposite directions to each other. Each spring 30 defines a central cavity 31 therein. A diameter of the cavity 31 is slightly less than a diameter of the first portion 22 of the shaft 20. Each spring 30 forms a plurality of protrusions 32 on a inner surface thereof. The shaft 20 can thus be frictionally inserted into the cavities 31 of the springs 30. Each spring 30 has a free end 34, for being retained in the slot 14 of the housing 10.

In assembly, the first portion 22 of the shaft 20 is received in the large hole 11 of the housing 10. The shaft 20 is coupled to the display 40 via the grooves of the connecting portion 26.

Figure 2:
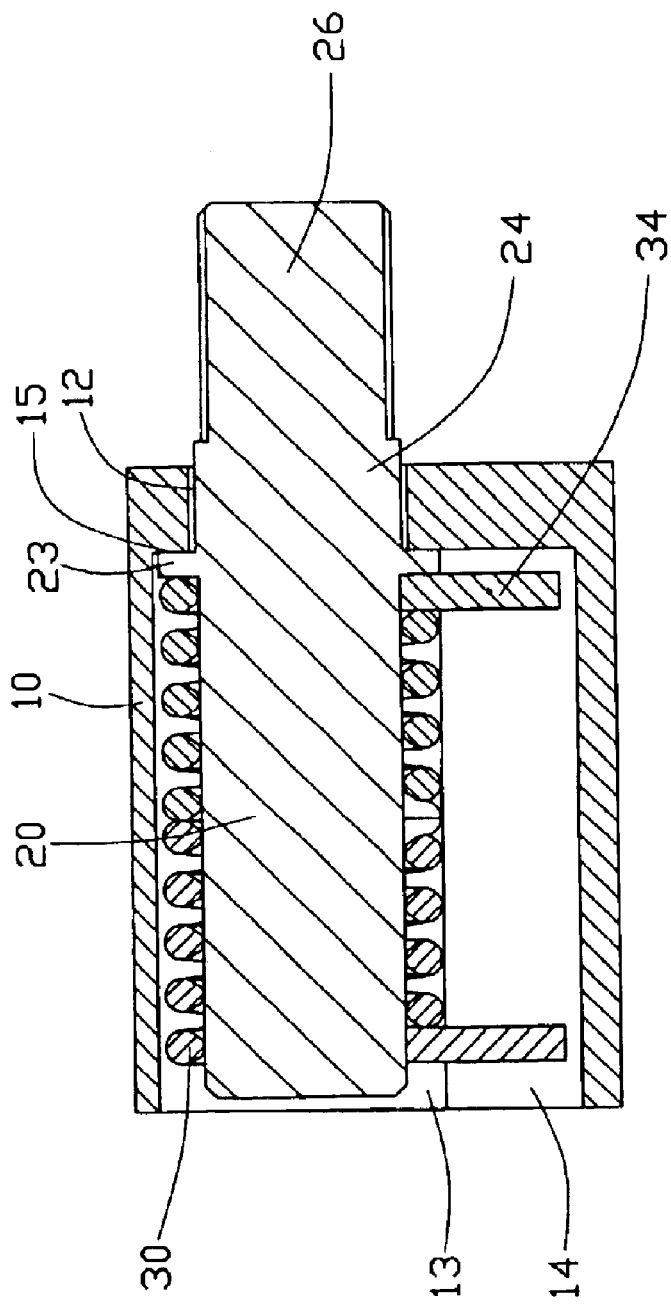
FIG. 2 is a cross-sectional view of the hinge device of FIG. 1 fully assembled, corresponding to line II—II of FIG. 1.
Figure 3A:
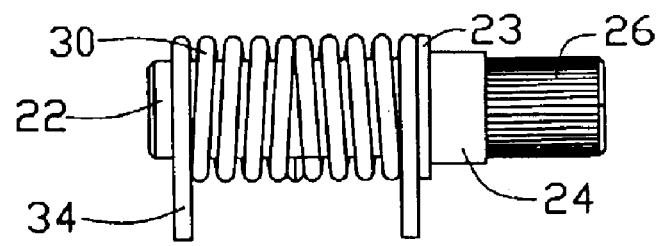
FIGS. 3A, 3B and 3D are each similar to FIG. 3C, but respectively show alternative configurations for assembling the springs onto the shaft.
Figure 3B:
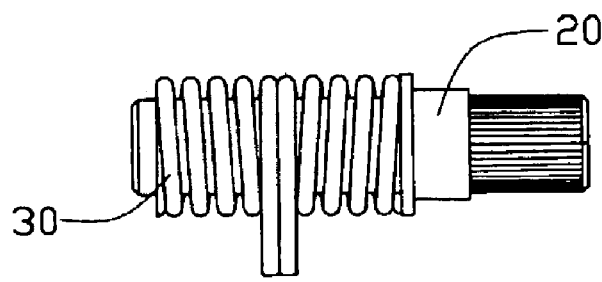
Figure 3C:
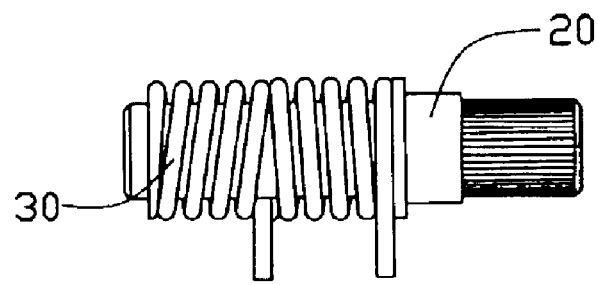
FIG. 3C is a side elevation view of the shaft and the springs of FIG. 1 assembled together.
Figure 3D:
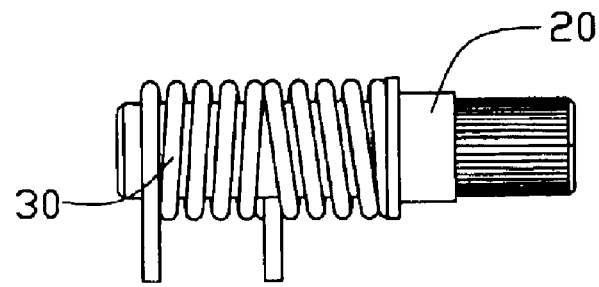

Referring to FIGS. 2, 3 and 4, the springs 30 are frictionally positioned around the first portion 22 of the shaft 20. The protrusions 32 of the springs 30 engaged with the first portion 22 of the shaft 20 provide friction torque resistance for the springs 30. The shaft 20 is fully inserted into the through hole 11 of the housing 10, and the free ends 34 of the spring 30 are retained in the slot 14 of the housing 10. The locating portion 23 of the shaft 20 abuts against the shoulder 15 of the housing 10. Because the springs 30 are coiled in opposite directions, the springs 30 cooperate with the shaft 20 to provide balanced friction torque when the hinge device is rotated in either of two opposite directions. That is, the torque resistance of the hinge device during rotation of the hinge device is substantially the same when the hinge device is rotated in either a clockwise or an anti-clockwise direction.

It is to be understood, however, that even though numerous characteristics and advantages of the present invention have been set forth in the foregoing description, together with details of the structure and function of invention, the disclosure is illustrative only, and changes may be made in detail, especially in matters of shape, size, and arrangement of parts within the principles of the invention to full extent indicated by the broad general meaning of the terms in which the appended claims are expressed.

What is claimed is:

1. A hinge device comprising:
   a housing defining a through hole and a slot therein, the through hole comprising a large hole portion and a small hole portion, the large hole portion communicating with the slot;
   a shaft extending through the through hole of the housing, the shaft comprising a first portion; and
   a pair of helical springs frictionally positioned around the first portion of the shaft in the large hole portion, the springs coiled in opposite directions from each other, each of the springs having a free end retained in the slot of the housing and forming a plurality of protrusions on an inner surface thereof.

2. The hinge device as described in claim 1, wherein the housing forms a shoulder at a junction of the small hole portion and the large hole portion.

3. The hinge device as described in claim 2, wherein the shaft further comprises in sequence a locating portion, an intermediate portion and a connecting portion.

4. The hinge device as described in claim 3, wherein the intermediate portion of the shaft is disposed in the small hole portion of the housing, and a diameter of the intermediate portion is less than a diameter of the small hole portion.

5. The hinge device as described in claim 3, wherein a diameter of the locating portion of the shaft is greater than a diameter of the small hole portion of the housing, and less than a diameter of a large hole portion of the housing, and the locating portion abuts the shoulder of the housing.

6. The hinge device as described in claim 3, wherein the connecting portion defines a plurality of parallel grooves in an outer surface thereof, and the grooves are parallel to an axis of the shaft.

7. The hinge device as described in claim 1, wherein the housing forms a pair of bars on opposite outer sides thereof, and defines a plurality of apertures above the bars.

8. The hinge device as described in claim 1, wherein each of the springs defines a central cavity, the first portion of the shaft extends through the cavity, and a diameter of the spring is slightly less than a diameter of first portion of the shaft.

9. A hinge device for pivotably connecting a first article and a second article, comprising:
   a housing coupled to the first article, the housing defining a through hole and a slot therein, the slot communicating with the through hole, the housing forming a pair of bars on opposite outer sides thereof, and defining a plurality of apertures above the bars for facilitating coupling of the housing with the first article;
   a shaft rotatably received in the through hole of the housing, the shaft comprising a first portion, and a connecting portion coupled to the second article; and
   a pair of springs frictionally positioned around the first portion of the shaft in the housing, the springs abutting each other and coiled in opposite directions from each other, each of the springs having a means for retaining the spring in the slot of the housing.

10. The hinge device as described in claim 9, wherein each of the springs forms a plurality of protrusion on an inner surface thereof, the protrusion abutting an circumferential surface of the first portion of the shaft.

11. The hinge device as described in claim 9, wherein the retaining means comprises a free end retained in the slot of the housing.

12. The hinge device as described in claim 9, wherein the shaft further comprises a locating portion and an intermediate portion between the first portion and the connecting portion.

13. The hinge device as described in claim 12, wherein the connecting portion defines a plurality of parallel grooves on an outer surface thereof for facilitating coupling of the connecting portion with the second article, the grooves being parallel to an axis of the shaft.

14. A hinge device assembly comprising:
   a housing defining a cylindrical hole extending in an axial direction thereof;
   a shaft disposed in the hole;
   a pair of helical springs axially frictionally surrounding the shaft and in the hole,
   each of said helical springs including a fixed end substantially immoveable relative to the housing, and an opposite free end; wherein
   when said shaft is rotated in one of clockwise and counterclockwise directions, one of said pair of springs performs a shrinkable torsion tendency relative to the corresponding fixed end of said one of said pair of springs while the other of said pair of spring performs an expandable torsion tendency relative the corresponding fixed end of said other of said pair of springs while the other of said pair of spring performs an expandable torsion tendency relative the corresponding fixed end of said other of said pair of springs; wherein
   the fixed ends of said pair of helical springs are aligned with each other in said axial direction.

15. The hinge device assembly as described in claim 14, wherein one of said pair of springs rotates clockwise and the other rotates counterclockwise along said axial direction.

16. The hinge device assembly as described in claim 14, wherein said pair of springs abut against each other along said axial direction.

17. The hinge device assembly as described in claim 14, wherein said fixed ends of the helical springs are essentially located vertically below a center line of said shaft.

18. The hinge device assembly as described in claim 14, wherein said fixed ends of the pair of helical springs are received in a common slot formed in the housing.

* * * * *